United States Patent
Lannsjö et al.

(10) Patent No.: US 10,317,995 B2
(45) Date of Patent: Jun. 11, 2019

(54) COMPONENT DETERMINATION AND GAZE PROVOKED INTERACTION

(71) Applicant: Tobii AB, Danderyd (SE)

(72) Inventors: Rebecka Lannsjö, Danderyd (SE); Henrik Björk, Danderyd (SE)

(73) Assignee: Tobii AB, Danderyd (SE)

(*) Notice: Subject to any disclaimer, the term of this patent is extended or adjusted under 35 U.S.C. 154(b) by 160 days.

(21) Appl. No.: 15/367,453

(22) Filed: Dec. 2, 2016

(65) Prior Publication Data

US 2017/0083088 A1   Mar. 23, 2017

Related U.S. Application Data (63) Continuation-in-part of application No. 14/600,896, filed on Jan. 20, 2015, which is a continuation-in-part of application No. 14/547,087, filed on Nov. 18, 2014, which is a continuation-in-part of application No. 14/547,089, filed on Nov. 18, 2014.

(60) Provisional application No. 61/905,536, filed on Nov. 18, 2013.

(51) Int. Cl.
    G06F 3/01       (2006.01)
    G06F 3/0488     (2013.01)
    G06F 3/0484     (2013.01)
    G06F 3/0485     (2013.01)

(52) U.S. Cl.
    CPC .............. *G06F 3/013* (2013.01); *G06F 3/012* (2013.01); *G06F 3/0485* (2013.01); *G06F 3/0488* (2013.01); *G06F 3/04842* (2013.01); *G06F 3/04845* (2013.01); *G06F 2203/04806* (2013.01)

(58) Field of Classification Search
    CPC ................................ G06F 3/013; G06F 3/012
    See application file for complete search history.

(56) References Cited

U.S. PATENT DOCUMENTS

| 5,390,281 A | 2/1995 | Luciw et al. |
| 5,471,542 A | 11/1995 | Ragland |
| 5,731,805 A | 3/1998 | Tognazzini et al. |
| 5,850,211 A | 12/1998 | Tognazzini |
| 6,011,555 A | 1/2000 | Eckhoff et al. |

(Continued)

FOREIGN PATENT DOCUMENTS

| CN | 105339866 A | 2/2016 |
| EP | 0816980 A2 | 1/1998 |

(Continued)

OTHER PUBLICATIONS

Office Action dated Nov. 29, 2017, for China Patent Application No. 201480024417.X; 21 pages.

(Continued)

*Primary Examiner* — Nelson M Rosario
(74) *Attorney, Agent, or Firm* — Kilpatrick Townsend & Stockton LLP

(57) ABSTRACT

According to the invention, a method for changing a display based at least in part on a gaze point of a user on the display is disclosed. The method may include receiving information identifying a location of the gaze point of the user on the display. The method may also include, based at least in part on the location of the gaze point, causing a virtual camera perspective to change, thereby causing content on the display associated with the virtual camera to change.

14 Claims, 7 Drawing Sheets

(56) References Cited

U.S. PATENT DOCUMENTS

| | | | |
|---|---|---|---|
| 6,021,403 A | 2/2000 | Horvitz et al. | |
| 6,067,565 A | 5/2000 | Horvitz | |
| 6,085,226 A | 7/2000 | Horvitz | |
| 6,204,828 B1 | 3/2001 | Amir et al. | |
| 6,233,570 B1 | 5/2001 | Horvitz et al. | |
| 6,260,035 B1 | 7/2001 | Horvitz et al. | |
| 6,262,730 B1 | 7/2001 | Horvitz et al. | |
| 6,351,273 B1 | 2/2002 | Lemelson et al. | |
| 6,393,584 B1 | 5/2002 | McLaren et al. | |
| 6,421,064 B1 | 7/2002 | Lemelson et al. | |
| 6,578,962 B1 | 6/2003 | Amir et al. | |
| 6,603,491 B2 | 8/2003 | Lemelson et al. | |
| 6,734,845 B1 | 5/2004 | Nielsen et al. | |
| 6,873,314 B1 | 3/2005 | Campbell | |
| 6,882,354 B1 | 4/2005 | Nielsen | |
| 6,886,137 B2 | 4/2005 | Peck et al. | |
| 7,013,258 B1 | 3/2006 | Su et al. | |
| 7,091,928 B2 | 8/2006 | Rajasingham | |
| 7,113,170 B2 | 9/2006 | Lauper et al. | |
| 7,346,195 B2 | 3/2008 | Lauper et al. | |
| 7,486,302 B2 | 2/2009 | Shoemaker | |
| 7,572,008 B2 | 8/2009 | Elvesjo et al. | |
| 7,614,011 B2 | 11/2009 | Karidis et al. | |
| 7,630,254 B2 | 12/2009 | Lutze | |
| 7,630,524 B2 | 12/2009 | Lauper et al. | |
| 7,634,528 B2 | 12/2009 | Horvitz et al. | |
| 7,792,391 B2 | 9/2010 | Arima | |
| 8,094,122 B2 | 1/2012 | Molander et al. | |
| 8,226,574 B2 | 7/2012 | Whillock et al. | |
| 8,235,529 B1 | 8/2012 | Raffle et al. | |
| 8,339,446 B2 | 12/2012 | Blixt et al. | |
| 8,407,263 B2 | 3/2013 | Elad et al. | |
| 8,564,533 B2 | 10/2013 | Yuan | |
| 8,620,913 B2 | 12/2013 | Hough et al. | |
| 8,643,680 B2 | 2/2014 | Baldwin et al. | |
| 8,756,516 B2 | 6/2014 | Singh et al. | |
| 8,762,846 B2 | 6/2014 | Kellerman et al. | |
| 8,786,953 B2 | 7/2014 | Wheeler et al. | |
| 8,963,806 B1 | 2/2015 | Starner et al. | |
| 9,377,863 B2 | 6/2016 | Bychkov et al. | |
| 9,400,553 B2 | 7/2016 | Kerr et al. | |
| 9,423,870 B2 | 8/2016 | Teller et al. | |
| 9,423,871 B2 | 8/2016 | Sukumar | |
| 9,454,225 B2 | 9/2016 | Bychkov et al. | |
| 9,478,143 B1 | 10/2016 | Bowen | |
| 9,480,397 B2 | 11/2016 | Larsen | |
| 9,619,020 B2 | 4/2017 | George-Svahn et al. | |
| 2002/0032696 A1 | 3/2002 | Takiguchi et al. | |
| 2002/0105482 A1 | 8/2002 | Lemelson et al. | |
| 2002/0180799 A1 | 12/2002 | Peck et al. | |
| 2003/0020755 A1 | 1/2003 | Lemelson et al. | |
| 2003/0052903 A1 | 3/2003 | Weast | |
| 2003/0098954 A1 | 5/2003 | Amir et al. | |
| 2004/0175020 A1 | 9/2004 | Bradski et al. | |
| 2004/0199663 A1 | 10/2004 | Horvitz et al. | |
| 2005/0030322 A1 | 2/2005 | Gardos | |
| 2005/0047629 A1 | 3/2005 | Farrell et al. | |
| 2005/0197763 A1 | 9/2005 | Robbins et al. | |
| 2005/0221268 A1 | 10/2005 | Chaar et al. | |
| 2006/0066567 A1 | 3/2006 | Scharenbroch et al. | |
| 2006/0087502 A1 | 4/2006 | Karidis et al. | |
| 2006/0174213 A1 | 8/2006 | Kato et al. | |
| 2006/0192775 A1 | 8/2006 | Nicholson et al. | |
| 2006/0256133 A1 | 11/2006 | Rosenberg | |
| 2007/0078552 A1 | 4/2007 | Rosenberg | |
| 2007/0122064 A1 | 5/2007 | Arima | |
| 2007/0132663 A1 | 6/2007 | Iba et al. | |
| 2007/0164990 A1 | 7/2007 | Bjorklund et al. | |
| 2007/0219732 A1 | 9/2007 | Creus et al. | |
| 2007/0279591 A1 | 12/2007 | Wezowski et al. | |
| 2008/0074389 A1 | 3/2008 | Beale | |
| 2008/0114614 A1 | 5/2008 | Mahesh et al. | |
| 2008/0130950 A1 | 6/2008 | Miklos et al. | |
| 2008/0148149 A1 | 6/2008 | Singh et al. | |
| 2008/0270474 A1 | 10/2008 | Flake et al. | |
| 2008/0281915 A1 | 11/2008 | Elad et al. | |
| 2008/0320418 A1 | 12/2008 | Huang et al. | |
| 2009/0146950 A1 | 6/2009 | Maringelli | |
| 2009/0245600 A1 | 10/2009 | Hoffman et al. | |
| 2009/0273562 A1 | 11/2009 | Baliga et al. | |
| 2009/0315827 A1 | 12/2009 | Elvesjö et al. | |
| 2010/0079508 A1 | 4/2010 | Hodge et al. | |
| 2010/0125816 A1 | 5/2010 | Bezos | |
| 2010/0182232 A1 | 7/2010 | Zamoyski | |
| 2010/0225668 A1 | 9/2010 | Tatke et al. | |
| 2010/0245093 A1 | 9/2010 | Kobetski et al. | |
| 2010/0295774 A1 | 11/2010 | Hennessey | |
| 2011/0045810 A1 | 2/2011 | Issa et al. | |
| 2011/0115703 A1 | 5/2011 | Iba et al. | |
| 2011/0115883 A1 | 5/2011 | Kellerman et al. | |
| 2011/0119361 A1 | 5/2011 | Issa et al. | |
| 2011/0175932 A1 | 7/2011 | Yu et al. | |
| 2011/0270123 A1 | 11/2011 | Reiner | |
| 2012/0011170 A1 | 1/2012 | Elad et al. | |
| 2012/0050273 A1 | 3/2012 | Yoo et al. | |
| 2012/0105486 A1 | 5/2012 | Lankford et al. | |
| 2012/0256967 A1 | 10/2012 | Baldwin et al. | |
| 2012/0272179 A1 | 10/2012 | Stafford | |
| 2013/0044055 A1 | 2/2013 | Karmarkar et al. | |
| 2013/0132867 A1 | 5/2013 | Morris et al. | |
| 2013/0135196 A1 | 5/2013 | Park et al. | |
| 2013/0169560 A1 | 7/2013 | Cederlund et al. | |
| 2013/0176208 A1 | 7/2013 | Tanaka et al. | |
| 2013/0176250 A1 | 7/2013 | Lee et al. | |
| 2013/0229368 A1 | 9/2013 | Harada | |
| 2013/0267317 A1* | 10/2013 | Aoki | G07F 17/3206 463/32 |
| 2013/0275883 A1 | 10/2013 | Bharshankar et al. | |
| 2013/0283208 A1 | 10/2013 | Bychkov et al. | |
| 2013/0300637 A1* | 11/2013 | Smits | G03B 35/18 345/8 |
| 2013/0300654 A1 | 11/2013 | Seki | |
| 2013/0321400 A1 | 12/2013 | van Os et al. | |
| 2014/0002352 A1 | 1/2014 | Jacob et al. | |
| 2014/0019136 A1 | 1/2014 | Tanaka | |
| 2014/0026098 A1 | 1/2014 | Gilman | |
| 2014/0104197 A1 | 4/2014 | Khosravy et al. | |
| 2014/0126782 A1 | 5/2014 | Takai et al. | |
| 2014/0168054 A1 | 6/2014 | Yang et al. | |
| 2014/0184550 A1 | 7/2014 | Hennessey et al. | |
| 2014/0191948 A1 | 7/2014 | Kim et al. | |
| 2014/0195918 A1 | 7/2014 | Friedlander | |
| 2014/0211995 A1* | 7/2014 | Model | G06F 3/013 382/103 |
| 2014/0247208 A1 | 9/2014 | Henderek et al. | |
| 2014/0247210 A1 | 9/2014 | Henderek et al. | |
| 2014/0247215 A1 | 9/2014 | George-Svahn et al. | |
| 2014/0247232 A1 | 9/2014 | George-Svahn et al. | |
| 2014/0268054 A1 | 9/2014 | Olsson et al. | |
| 2014/0334666 A1 | 11/2014 | Lankford et al. | |
| 2015/0009238 A1 | 1/2015 | Kudalkar | |
| 2015/0138079 A1 | 5/2015 | Lannsjö | |
| 2015/0138244 A1 | 5/2015 | George-Svahn et al. | |
| 2015/0143293 A1 | 5/2015 | George-Svahn et al. | |
| 2015/0149956 A1 | 5/2015 | Kempinski et al. | |
| 2016/0116980 A1 | 4/2016 | George-Svahn et al. | |
| 2017/0177078 A1 | 6/2017 | Henderek et al. | |
| 2017/0177079 A1 | 6/2017 | George-Svahn et al. | |

FOREIGN PATENT DOCUMENTS

| | | |
|---|---|---|
| EP | 0816980 A3 | 11/1998 |
| EP | 0903662 A2 | 3/1999 |
| EP | 0912932 A2 | 5/1999 |
| EP | 0816980 B1 | 1/2001 |
| EP | 1646026 | 4/2006 |
| EP | 0912932 B1 | 8/2006 |
| EP | 1812881 | 8/2007 |
| EP | 1832753 | 9/2007 |
| EP | 1970649 | 9/2008 |
| EP | 2048326 | 4/2009 |
| EP | 1646026 | 9/2009 |
| EP | 2075430 | 7/2010 |
| EP | 2613224 | 7/2013 |

(56) References Cited

FOREIGN PATENT DOCUMENTS

| | | |
|---|---|---|
| EP | 2695046 | 2/2014 |
| EP | 2752733 | 7/2014 |
| EP | 2762997 | 8/2014 |
| EP | 2962175 | 1/2016 |
| EP | 3088997 | 11/2016 |
| GB | 2490864 | 11/2012 |
| KR | 20160005013 A | 1/2016 |
| WO | 9202880 | 2/1992 |
| WO | 1998003907 | 1/1998 |
| WO | 2006045843 | 5/2006 |
| WO | 2010051037 | 5/2010 |
| WO | 2010127714 | 11/2010 |
| WO | 2010132991 | 11/2010 |
| WO | 2010141403 | 12/2010 |
| WO | 2012138744 | 10/2012 |
| WO | 2012145180 | 10/2012 |
| WO | 2013033842 | 3/2013 |
| WO | 2013144807 | 10/2013 |
| WO | 2013168171 | 11/2013 |
| WO | 2013168173 | 11/2013 |
| WO | 2014134623 | 9/2014 |

OTHER PUBLICATIONS

U.S. Appl. No. 14/195,755, Restriction Requirement dated Apr. 15, 2016, 22 pages.
U.S. Appl. No. 14/547,087, Final Office Action dated Feb. 16, 2017, 44 pages.
U.S. Appl. No. 14/600,896, Non-Final Office Action dated Jun. 30, 2016, 13 pages.
U.S. Appl. No. 13/802,240, Final office Action dated May 31, 2017, all pages.
U.S. Appl. No. 15/449,058, Non-Final Office Action dated Jun. 13, 2017, all pages.
U.S. Appl. No. 15/449,058, Notice of Publication dated Jun. 22, 2017; all pages.
U.S. Appl. No. 15/446,843, Notice of Publication dated Jun. 22, 2017; all pages.
U.S. Appl. No. 14/547,087, Non-Final Office Action dated Jul. 12, 2017, all pages.
European Application No. 97304371.4, Extended European Search Report dated Nov. 11, 1998, 4 pages.
International Application No. PCT/US1997/010856, International Search Report and Written Opinion dated Jul. 16, 1998, 4 pages.
U.S. Appl. No. 14/547,089, Non-Final Office Action dated Apr. 14, 2017, 13 pages.
U.S. Appl. No. 14/600,896, Final Office Action dated Mar. 22, 2017, 13 pages.
U.S. Appl. No. 14/986,141, Non-Final Office Action dated Apr. 19, 2017, 19 pages.
U.S. Appl. No. 15/446,843, Restriction Requirement dated May 2, 2017, 22 pages.
Adjacent, Dictionary.com, http://dictionary.reference.com/browse/adjacent, Nov. 18, 2011, 1 page.
U.S. Appl. No. 13/802,240, Final Office Action dated Mar. 3, 2016, 13 pages.
U.S. Appl. No. 13/802,240, Final Office Action dated Jun. 23, 2015, 14 pages.
U.S. Appl. No. 13/802,240, Non-Final Office Action dated Nov. 13, 2015, 11 pages.
U.S. Appl. No. 13/802,240, Non-Final Office Action dated Mar. 20, 2015, 20 pages.
U.S. Appl. No. 13/802,240, Non-Final Office Action dated Sep. 23, 2016, 20 pages.
U.S. Appl. No. 13/894,424, Final Office Action dated May 8, 2015, 35 pages.
U.S. Appl. No. 13/894,424, Non-Final Office Action dated Dec. 19, 2014, 32 pages.
U.S. Appl. No. 14/195,743, Advisory Action dated Dec. 14, 2016, 3 pages.
U.S. Appl. No. 14/195,743, Final Office Action dated Oct. 6, 2016, 16 pages.
U.S. Appl. No. 14/195,743, Non-Final Office Action dated Dec. 15, 2015, 45 pages.
U.S. Appl. No. 14/195,743, Restriction Requirement dated Jun. 17, 2015, 25 pages.
U.S. Appl. No. 14/195,755, Non Final Office Action dated Nov. 15, 2016, 26 pages.
U.S. Appl. No. 14/195,789, Advisory Action dated Apr. 8, 2016, 5 pages.
U.S. Appl. No. 14/195,789, Final Office Action dated Dec. 18, 2015, 18 pages.
U.S. Appl. No. 14/195,789, Non-Final Office Action dated May 12, 2015, 15 pages.
U.S. Appl. No. 14/195,789, Non-Final Office Action dated May 20, 2016, 20 pages.
U.S. Appl. No. 14/195,789, Notice of Allowance dated Dec. 1, 2016, 13 pages.
U.S. Appl. No. 14/547,087, Non-Final Office Action dated May 20, 2016, 32 pages.
U.S. Appl. No. 14/986,141, Restriction Requirement dated Dec. 16, 2016, 13 pages.
European Application No. 14716455.2, Office Action dated Sep. 30, 2016, 5 pages.
European Application No. 16174545.0, Extended European Search Report dated Oct. 4, 2016, 7 pages.
European Application No. 16174545.0, Office Action dated Jul. 1, 2016, 1 page.
Korean Application No. 10-2015-7027213, Office Action dated Oct. 7, 2015, 3 pages.
Kumar et al., Gaze-enhanced Scrolling Techniques, ACM, UIST'07, Oct. 7-10, 2007, 4 pages.
International Application No. PCT/US2014/020024, International Preliminary Report on Patentability dated Sep. 11, 2015, 11 pages.
International Application No. PCT/US2014/020024, International Search Report and Written Opinion dated Jul. 29, 2014, 15 pages.

* cited by examiner

COMPONENT DETERMINATION AND GAZE PROVOKED INTERACTION

CROSS-REFERENCE TO RELATED APPLICATIONS

This application is a continuation-in-part of U.S. patent application Ser. No. 14/600,896 filed Jan. 20, 2015, entitled "COMPONENT DETERMINATION AND GAZE PROVOKED INTERACTION," the entire disclosure of which is hereby incorporated by reference, for all purposes, as if fully set forth herein.

U.S. patent application Ser. No. 14/600,896 is a continuation-in-part of U.S. patent application Ser. No. 14/547,087 filed Nov. 18, 2014, entitled "COMPONENT DETERMINATION AND GAZE PROVOKED INTERACTION," the entire disclosure of which is hereby incorporated by reference, for all purposes, as if fully set forth herein.

U.S. patent application Ser. No. 14/547,087 claims priority to Provisional U.S. Patent Application No. 61/905,536 filed Nov. 18, 2013, entitled "COMPONENT DETERMINATION AND GAZE PROVOKED INTERACTION," to which priority is also claimed in this application, and of which the entire disclosure is hereby incorporated by reference, for all purposes, as if fully set forth herein.

U.S. patent application Ser. No. 14/600,896 is also a continuation-in-part of U.S. patent application Ser. No. 14/547,089 filed Nov. 18, 2014, entitled "COMPONENT DETERMINATION AND GAZE PROVOKED INTERACTION," the entire disclosure of which is hereby incorporated by reference, for all purposes, as if fully set forth herein.

U.S. patent application Ser. No. 14/547,089 also claims priority to Provisional U.S. Patent Application No. 61/905,536 filed Nov. 18, 2013, entitled "COMPONENT DETERMINATION AND GAZE PROVOKED INTERACTION," to which priority is also claimed in this application, and of which the entire disclosure is hereby incorporated by reference, for all purposes, as if fully set forth herein.

BACKGROUND OF THE INVENTION

The present invention generally relates to systems and methods for determining components for gaze provoked interactions and in particular, to systems and methods for performing gaze provoked interactions.

Detection of a user's gaze direction by an eye tracking device has enabled a new generation of computer input. As accuracy of eye tracking devices has improved, it is now possible to determine with good accuracy a point on a computer display at which a user is looking. This information can be used to drive a computer in whole, or at least in part.

There are specific advantages in combining gaze input with a physical or more traditional input such as a mouse, keyboard, touchpad, touchscreen, voice, or the like. This allows for a faster and more natural feeling interaction with a computer, as a user's gaze is usually a precursor to an action being performed on the computer. For example, a user will look at an icon before clicking it with a computer mouse. Knowing in advance the possibility of an action being performed advantageous for programs running on a computer.

However, there exist problems for implementing user-input schemes which take advantage of this additional gaze information. For example, different computer programs and on-screen components behave differently. It may therefore be beneficial to tailor gaze interaction as dependent upon the context within which a user is interacting with a computer program.

Further, the type of interaction with the computer program or on-screen component potentially caused by a gaze interaction must be described or otherwise made known to the user. It provides a great advantage to a user if a gaze based interaction is enhanced or otherwise improved over a traditional interaction. In other words, to merely mimic a known and/or previously existing interaction by starting an interaction with a gaze of a user's eyes might may not be as advantageous as a faster, more intuitive, and/or enhanced interaction.

Embodiments of the present invention provides solutions to these and other problems.

BRIEF DESCRIPTION OF THE INVENTION

In one embodiment, a method for changing a display based at least in part on a gaze point of a user on the display is provided. The method may include receiving information identifying a location of the gaze point of the user on the display. The method may also include, based at least in part on the location of the gaze point, causing a virtual camera perspective to change, thereby causing content on the display associated with the virtual camera to change.

In another embodiment, a non-transitory machine readable medium is provided. The medium may have instructions stored thereon for changing a display based at least in part on a gaze point of a user on the display. The instructions may be executable by at least one processor for at least receiving information identifying a location of the gaze point of the user on the display. The instruction may also be executable for, based at least in part on the location of the gaze point, causing a virtual camera perspective to change, thereby causing content on the display associated with the virtual camera to change.

In another embodiment, a system for changing a display based at least in part on a gaze point of a user on the display is provided. The system may include an eye tracking device and a processor. The eye tracking device may be for determining a location of the gaze point of the user on the display. The processor may be for causing, based at least in part on the location of the gaze point, a virtual camera perspective to change, thereby causing content on the display associated with the virtual camera to change.

BRIEF DESCRIPTION OF THE DRAWINGS

The present invention is described in conjunction with the appended figures.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. One of skill in the art will understand that various changes may be made in the function and arrangement of elements without departing from the spirit and scope of the invention as set forth in the appended claims. For example, not every detail of each embodiment discussed herein may be present in all versions of that embodiment, or details of one embodiment discussed herein may be present in any other embodiment discussed herein, or any possible version of those other embodiments.

Specific details are given in the following description to provide a thorough understanding of the embodiments. However, it will be understood by one of ordinary skill in the art that the embodiments may be practiced without these specific details. For example, circuits, systems, networks, processes, and other elements in the invention may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments, or there may be additional operations not discussed with specific regard to the particular process. A process may correspond to a method, a function, a procedure, a subroutine, a subprogram, etc. When a process corresponds to a function, its termination corresponds to a return of the function to the calling function or the main function.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. One or more processors may perform the necessary tasks.

In some embodiments of the invention, systems and methods are provided for effectively performing gaze provoked interactions and for defining gaze provoked interactions themselves. In one embodiment, there may be provided systems and methods for determining suitable gaze provoked interactions during a given point in time. Merely by example, the method may include determining the types of computer programs and on-screen components available on a computing system. The method may also include determining possible gaze provoked interactions for each computer program and on-screen component. The method may further include, upon activation of a computer program or on-screen component, determining the most relevant gaze provoked interaction, and then performing the gaze provoked interaction.

In some embodiments, a computer program may typically show various on-screen components via a display. These components may include, but are not limited to, buttons, text, menus, scrollable windows, images, windows capable of zoom, and the like.

Typically a computer system executes software that describes typical interactions with the on-screen components, for example a button may be activated by a left mouse click; or a scrollable window may scroll up or down using a scroll wheel on a mouse, or arrow keys on a keyboard.

Computer software may be executed by the computer system which determines the components displayable on-screen and determines which gaze provoked interactions may be utilized to interact with those components. A gaze provoked interaction is an interaction whereby a user's gaze is a key part of the interaction, examples of gaze provoked interactions will be described below.

Once the computer software has determined possible gaze provoked interactions for the displayed components, it may quickly and efficiently perform that gaze provoked interaction once it has been activated by a user. Activation may often be initiated by a non-gaze input such as pressing of a button, key, and/or at least some portion of a touchpad. Additionally, voice or other auditory commands may be used whenever non-gaze inputs are discussed herein. Specific methods for activating gaze provoked interactions will also be described below.

In some embodiments, the computer software may inject or otherwise take control of the on-screen components or actions performed by the on-screen components to provide enhanced functionality. For example, a scrollable window may typically be scrolled a predetermined amount when a down arrow is pressed on a keyboard, however by using a gaze provoked interaction, the scrollable window may scroll down different amounts depending on the gaze provoked interaction. If this variable scrolling is not supported by the computer program directly controlling the on-screen component, the computer software may emulate supported functionality in order to provide the desired gaze provoked interaction. For example, the computer program may emulate the function of a scroll wheel in combination with an arrow on a keyboard. Any reference herein to the term "scroll" is intended to include a movement of content on a display in any direction, not limited to vertical, which renders more content viewable in the direction of the movement, and perhaps less content viewable in the direction opposite the movement. For example a scroll may be performed horizontally or diagonally in what may sometimes be referred to as a panning motion. In some embodiments, a scroll may be combined with a zooming of content to render more content viewable in the direction of the scroll, without correlated loss of viewable content in the direction opposite of the scroll.

Alternatively, a computer program may natively support a gaze provoked interaction providing enhanced functionality over a traditional interaction. In such cases, the computer program would contain executable instructions that may be invoked upon activation of a gaze provoked interaction. Typically, these instructions are added to the computer program during development of the computer program. The computer program could further comprise part of the operating system of the computing system, and thereby provide enhanced gaze provoked interaction as a standard interaction to any components capable of calling the interaction from the operating system. Many gaze provoked interactions are possible using embodiments of the invention.

A first gaze provoked interaction includes a computer program highlighting or otherwise marking a component on a display upon a gaze being detected at or near the component. For example, the computer program may highlight a button or text item when a user is gazing at the button or text item. In some embodiments, the highlighting or marking may include altering the overall color of the component, providing a visual indicator on or near the component, and/or shading the component in some way. Any method which distinguishes the component such that it is evident to the user that it is the intended target and is being gazed upon is suitable as highlighting/marking.

A second gaze provoked interaction includes a method of interacting with a map or other image displayed on a screen. In this interaction, a user may center the display of the map or image by gazing at a point and pressing a predefined key, button, or at least some portion of a touchpad. The computer software will then refresh the display of the image or map such that the point at which the user was gazing when the key or button was pressed will be at the center of the displayed image or map.

A third gaze provoked interaction includes enlarging or decreasing at least a portion of a displayed map or image (e.g., "zooming in/out"). In this interaction, a user may press a key, button, or some portion of a touchpad twice in quick succession on while gazing at a point (i.e., two inputs within a predetermined amount of time). Other non-gaze inputs may be used in place of pressing a key, button, or at least a portion of a touchpad. The computer software may then refresh the display such that the area around the point at which the user was gazing when the non-gaze input was received is displayed in greater detail (zoomed in) or lesser detail (zoomed out). In some embodiments, different keys/inputs may be associated with a desire to zoom out versus zoom in. For example, maintaining contact on a key, button or a portion of a touchpad while pressing another key, button or portion of a touchpad may indicate a desire to zoom out versus zoom in. In addition, the amount of pressure exerted upon a key, button or a portion of a touchpad may influence the speed at which a zoom action is performed. Further, although this interaction has been described with reference to a map or image, it functions equally with any form of component that is capable of zoom, this includes web pages, documents, folders, and the like. Whenever "zooming" in or out on a display is discussed herein, it will be understood to mean that the display increases or decreases the rendered size of graphical/textual content near a particular point on the display. When zooming in occurs, less of the content will be viewable on the display, but such lesser content will be displayed in greater detail. When zooming out occurs, more of the content will be viewable on the display, but such additional content, as well as the original content, will be displayed in lesser detail.

A fourth gaze provoked interaction includes interacting with a map or other displayed image, and provides another method by which to zoom in or zoom out. The interaction consists of holding down a key, button or touchpad while gazing at a point on the map or displayed image. The computer software refreshes the display such that the area around the point at which the user is gazing slowly zooms in or out until the key, button or touchpad is released. In some embodiments, different keys/inputs may be associated with a desire to zoom out versus zoom in. As a further improvement, the speed at which a zoom action is performed may be moderated by the length of time upon which pressure is maintained on the key, button or touchpad. For example the speed of the zoom action (i.e. the rate at which a magnification is increased or decreased) may increase or decrease at an exponential (or other) rate.

As a further improvement on the fourth gaze provoked interaction, while holding down a key, button, portion of a touchpad, or combination thereof, a map or displayed image/content may zoom out. In other words, the items displayed on the display may be altered such that it appears to the user that they reduce in size to give the impression of distance. Further items may be introduced to the display to enhance this impression. Whilst maintaining contact with the key, button, portion of a touchpad, or combination thereof, the user may move their gaze position around the zoomed out display. Once the user releases contact with the key, button, portion of a touchpad, or combination thereof, the display may zoom back to the original level of zoom, however at the gaze position of the user. In this manner, a user when viewing a large item such as a large image, map, text document, or 3D object may hold down a key, button, portion of a touchpad or combination thereof to provide a zoomed out view. Whilst continuing to hold down the key or the like, the user may select a new area on the zoomed out view to view in more detail, then release their pressure upon the key or the like and the display will zoom to the gaze position at the time of release of pressure. The magnification level of the zoomed in view may be that of the original view before pressure to the key or the like was applied, or it can be dynamically determined based on the nature of displayed items at the user's new gaze position.

In a further improvement of the fourth gaze provoked interaction, a zoom action may be executed by a pinching gesture performed on a touch sensitive surface using two or more fingers, including potentially five. Upon release of fingers from the touch sensitive surface or upon a pinching gesture in the opposite direction being performed, an opposing zoom action may be performed.

Figure 1:
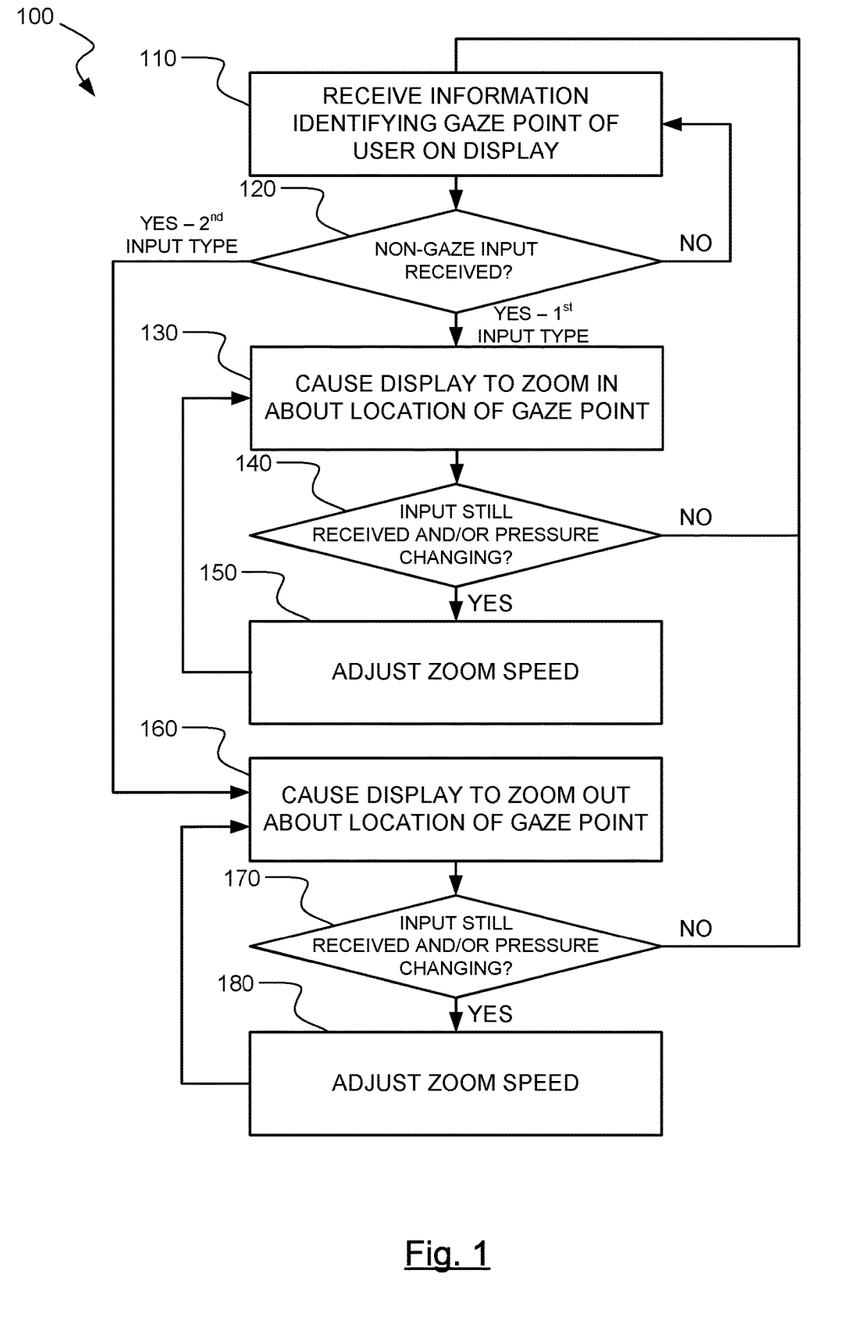
FIG. 1 is a block diagram of one method of an embodiment of the invention for causing a zoom on a display based on a gaze input.

FIG. 1 is a block diagram of one method 100 of an embodiment of the invention for causing a zoom based on a gaze input. At block 110, information identifying a gaze point of a user on a display is received. At block 120, a non-gaze input is awaited. If such an input is not received, method 100 returns to block 110. However, if a first type of non-gaze input is received (for example, a press of the up-arrow key on an associated keyboard; or a left mouse click), then method 100 continues to block 130 and the display is zoomed in about the location of the gaze point. At block 140, if a consistent input with increasing magnitude, for example, pressure at a touch pad, is being received, then the zoom speed may be increased by some predetermined rate based at least in part on the increased magnitude of the input (e.g., exponentially, proportionally, etc.) at block 150.

If, at block 120, a second type of non-gaze input is received (for example, a press of the down-arrow key on the associated keyboard, or a right mouse click), then method 100 continues to block 160 and the display is zoomed out about the location of the gaze point. At block 170, if a consistent input with increasing magnitude, for example, pressure at a touch pad, is being received, then the zoom speed may be increased by some predetermined rate based at least in part on the increased magnitude of the input (e.g., exponentially, proportionally, etc.) at block 180.

Figure 2:
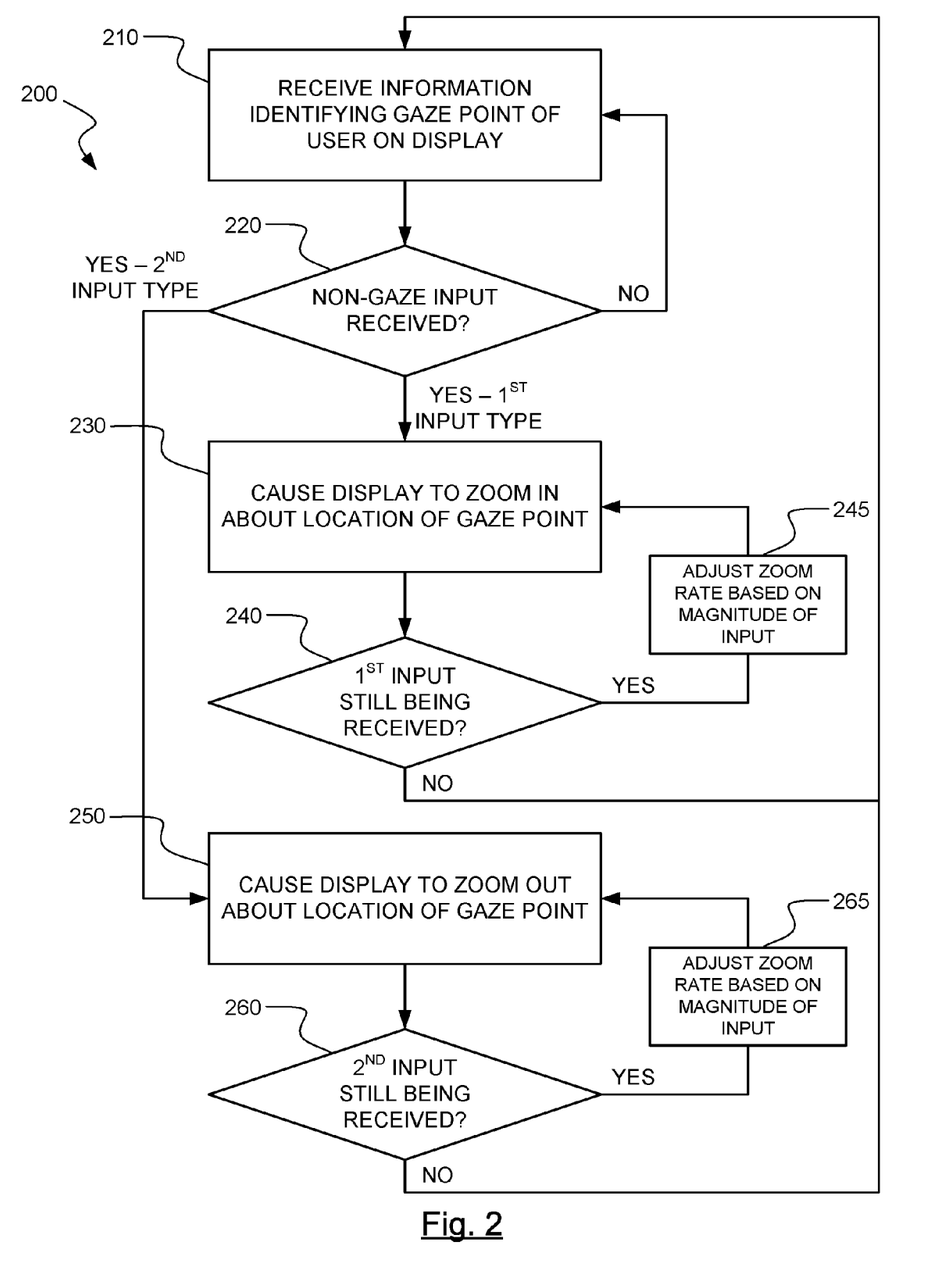
FIG. 2 is a block diagram of another method of an embodiment of the invention for causing a zoom on a display based on a gaze input.

FIG. 2 is a block diagram of another method 200 of an embodiment of the invention for causing a zoom based on a gaze input. At block 210, information identifying a gaze point of a user on a display is received. At block 220, a non-gaze input is awaited. If such an input is not received, method 200 returns to block 210. However, if a first type of non-gaze input is received (for example, a press of the up-arrow key on an associated keyboard; or a left mouse click), then method 200 continues to block 230 and the display is zoomed in about the location of the gaze point. Then at block 240, the first input is monitored. If the input continues, then the display continues to zoom in at block 230. At block 245, the zoom rate may be adjusted in some embodiments if the magnitude (e.g., pressure at a touch pad) of an input is changing. The zoom rate may be adjusted in different manners relative to the change of input magnitude (e.g., proportionally, exponentially, etc.). If the input does not continue, then the zooming ceases, and method 200 returns to block 210. The amount of zoom in is dependent upon the particular embodiment of the invention implemented, as discussed herein.

If, at block 220, a second type of non-gaze input is received (for example, a press of the down-arrow key on the associated keyboard, or a right mouse click), then method 200 continues to block 250 and the display is zoomed out about the location of the gaze point. Then at block 260, the second input is monitored. If the input continues, then the display continues to zoom out at block 250. At block 265, the zoom rate may be adjusted in some embodiments if the magnitude (e.g., pressure at a touch pad) of an input is changing. The zoom rate may be adjusted in different manners relative to the change of input magnitude (e.g., proportionally, exponentially, etc.). If the input does not continue, then the zooming ceases, and method 200 returns to block 210. The amount of zoom out is dependent upon the particular embodiment of the invention implemented, as discussed herein.

A fifth gaze provoked interaction includes scrolling a display, window, or other particular area on a screen. The interaction may include scrolling in the direction of a user's gaze, whereby if a user is gazing in the lower half of the window or other area, upon pressing a predefined button, key, or at least some portion of a touchpad, the computer software refreshes the display such that the window or other area has scrolled down. If the user is gazing in the top half of the display or other area, the window or other area would alternatively scroll upwards upon the non-gaze input being received. In some embodiments, a visual indication on the display of the anticipated scroll direction, or of the half of the screen in which the user is gazing, may be provided. Any portion of the screen as defined by the computer software may constitute the area scrolled. For example, a third or quarter of the screen may be scrolled, or perhaps a particular window, depending on the embodiment. Further, scrolling may be initiated by the computer software upon the user gazing within a predefined area on the display, regardless of the user activating non-gaze input such as a key, button, touchpad, or the like. This may particularly be the case if the user has previously issued a command to the computer program that the user desires to implement the third gaze provoked interaction (discussed above) by gazing at a predetermined area of the screen, this command may be issued by pressing a key, button, touchpad, combination thereof, or the like. Additionally, in some embodiments, a previously issued command by the user may cause scrolling to occur based only on gaze-input (not requiring a non-gaze input to be received simultaneously). In these embodiments, a gaze input of a predetermined amount of time may be required to activate such automated scrolling.

A sixth gaze provoked interaction includes scrolling a window or other area or a screen by a predetermined amount based on a user's gaze. This interaction includes the computer software causing text or other information within a window or other area to scroll or move in a direction indicated by the user's gaze, whereby the text or other information scrolls a predetermined amount in one movement. In other words, the computer software, upon activation of the gaze provoked interaction, causes the window or other area to refresh such that a portion of text or other information that was not previously displayed is now displayed. The gaze provoked interaction may be activated by a user pressing a key, button, or touchpad or by simply gazing at a predefined point on the screen such as the top or bottom third or quarter of the screen (or other sub-portion of the display). Typically if the user gazing towards the top of the screen the text or other information will scroll downwards, whereas if the user gazes towards the bottom of the screen, the text or other information will scroll upwards.

As a further improvement in some embodiments, incorporating various aspects of the herein described gaze provoked gaze interactions, it may be possible to utilize gaze as an input to a computer system, wherein such input is cancelled upon activation of another non-gaze input device. By way of example, a user may interact with computer software displaying images, text, graphics, or the like such that the displayed information pans, scrolls, or otherwise moves based on the gaze direction of the user. Upon the user activating a non-gaze input device such as a mouse, touchpad, key, button, or any other form of input, the gaze-caused movement of the displayed information ceases instantly or almost instantly. In this way gaze may be provided as an input to the computer software which is easily overridden if the user wishes to interact with the software in a conventional manner (i.e., via a non-gaze input device).

One example in which this technique is applicable is the use of gaze as an input in a video game or the like. A video game typically includes a virtual camera or cameras, the perspective of which is used in rendering the graphics displayed on screen. This camera or cameras can be controlled by the gaze direction of the user and upon the user utilizing a non-gaze input device normally associated with control of the camera or cameras, the camera or cameras cease to be controlled by the gaze direction from the gaze input. Take for example a scenario where a user is controlling a character on a display, the user may at some point control the view of the character or the direction in which the character moves within the game world via their gaze direction. However, once the user takes control of the camera in the game world by using a conventional non-gaze input device such as a mouse or touchpad, the gaze based control of the virtual camera or cameras ceases, and control of such returns to the non-gaze input device. The speed of the change in view/direction can be dependent on the location of the gaze point on the display, as discussed in regard to other embodiments herein.

A second example of this technique is the use of gaze in altering the display of a map or the like on a display. The map may pan and scroll in a range of 360 degrees and such panning and/or scrolling may be based on gaze direction as received from a gaze input device. However, upon the user utilizing a conventional non-gaze input device, the panning and/or scrolling action may cease. The cessation may be immediate or slowly decelerate as previously described.

Further, the type of camera control may differ dependent on whether the game is a two dimensional or three dimensional game. This will affect the scope of the camera to provide differing points of view. Also, some game controls for certain activities may remain unaffected by gaze based input for other particular activities. Merely by way of example, movement of a character on a display may be controlled by non-gaze input devices while camera control of either a first-person or third-person view of the character may be controlled by the gaze direction received from a gaze input device. Thus, a person controlling the character could cause the character to move using a non-gaze input device while using a gaze input device to control the direction the character looks, or the direction of the virtual camera observing the character. Certain non-gaze inputs could still override/cease gaze input control of look/camera direction as described above. The reverse is also possible in some embodiments. For example, movement could be controlled by gaze input, while look/camera direction could be controlled by non-gaze input. Certain non-gaze inputs could still override/cease gaze input control of character movement as described above.

Further, the present invention may be used in a portable device such as a mobile phone, tablet, or the like. In this manner, the camera of a game may be controlled by a gaze input while other inputs may be provided by contacting non-gaze input devices such as the touch sensitive screen of the portable device. In some embodiments, it is desirable to display on-screen visual indicators of further inputs such as buttons that a user may press.

In a further embodiment, a gaze tracking device may be configured to provide head position and orientation information. This head position and orientation information may be used to determine the direction in which to direct the virtual camera or cameras. It is possible to combine the gaze information and head position information to provide a more exact determination of a user's intended target and thus better estimate the location at which to direct the virtual camera or cameras.

Head position and/or orientation information may be combined with gaze information in the following manner: degrees of head rotation and the distance from a determined gaze point on a screen to the center of the screen ("gaze offset") are combined to influence rotation of a virtual camera. Gaze offset may be expressed in percentages, where 10% equals 10% of the distance between the center of the screen to the edge of the screen, 50% equates to 50% of the distance etc. It may be advantageous to round gaze offsets up or down.

To demonstrate this aspect of the present invention, below are some example implementations of head rotation and gaze offset, for illustration purposes only:

0 degrees of head rotation, and 0% gaze offset equates to no rotation of the virtual camera, as the user is looking directly at the screen.
    10 degrees of head rotation, and 0% gaze offset equates to 10 (10+0) degrees of virtual camera rotation.
    10 degrees of head rotation, and 50% gaze offset equates to 15 (10+5) degrees of virtual camera rotation.
    10 degrees of head rotation, and 100% gaze offset equates to 20 (10+10) degrees of virtual camera rotation.
    20 degrees of head rotation, and 0% gaze offset equates to 20 (20+0) degrees of virtual camera rotation.
    20 degrees of head rotation, and 50% gaze offset equates to 30 (20+10)—degrees of virtual camera rotation.
    20 degrees of head rotation, 100% gaze offset equates to 40 (20+20) degrees of virtual camera rotation.

In a further aspect the gaze offset may affect how head rotation is scaled. To demonstrate this aspect, below are example implementations for illustration purposes only. Where 100% gaze offset equals 10 degrees' rotation for the gaze component, and where there is linear scaling of head rotation depending on gaze offset (i.e., X % gaze offset and Y degrees of head rotation results in X/10+Y*X/100 degrees of virtual rotation):

0 degrees head rotation, 0% gaze offset equates to no rotation of the virtual camera, as the user is looking directly at the screen with their head directly facing the screen.
    0% gaze offset, and 10 degrees of head rotation equates to 0 (0+0) degrees of virtual camera rotation.
    50% gaze offset, 10 degrees of head rotation equates to 5 (5+5) degrees of virtual rotation.
    100% gaze offset, 10 degrees of head rotation equates to 20 (10+10) degrees of virtual camera rotation.
    0% gaze offset, 20 degrees of head rotation equates to 0 (0+0) degrees of virtual camera rotation.
    50% gaze offset, 20 degrees of head rotation, equates to 15 (5+10) degrees of virtual camera rotation.
    100% gaze offset, 20 degrees of head rotation equates to 30 (10+20) degrees of virtual camera rotation.

Figure 3:
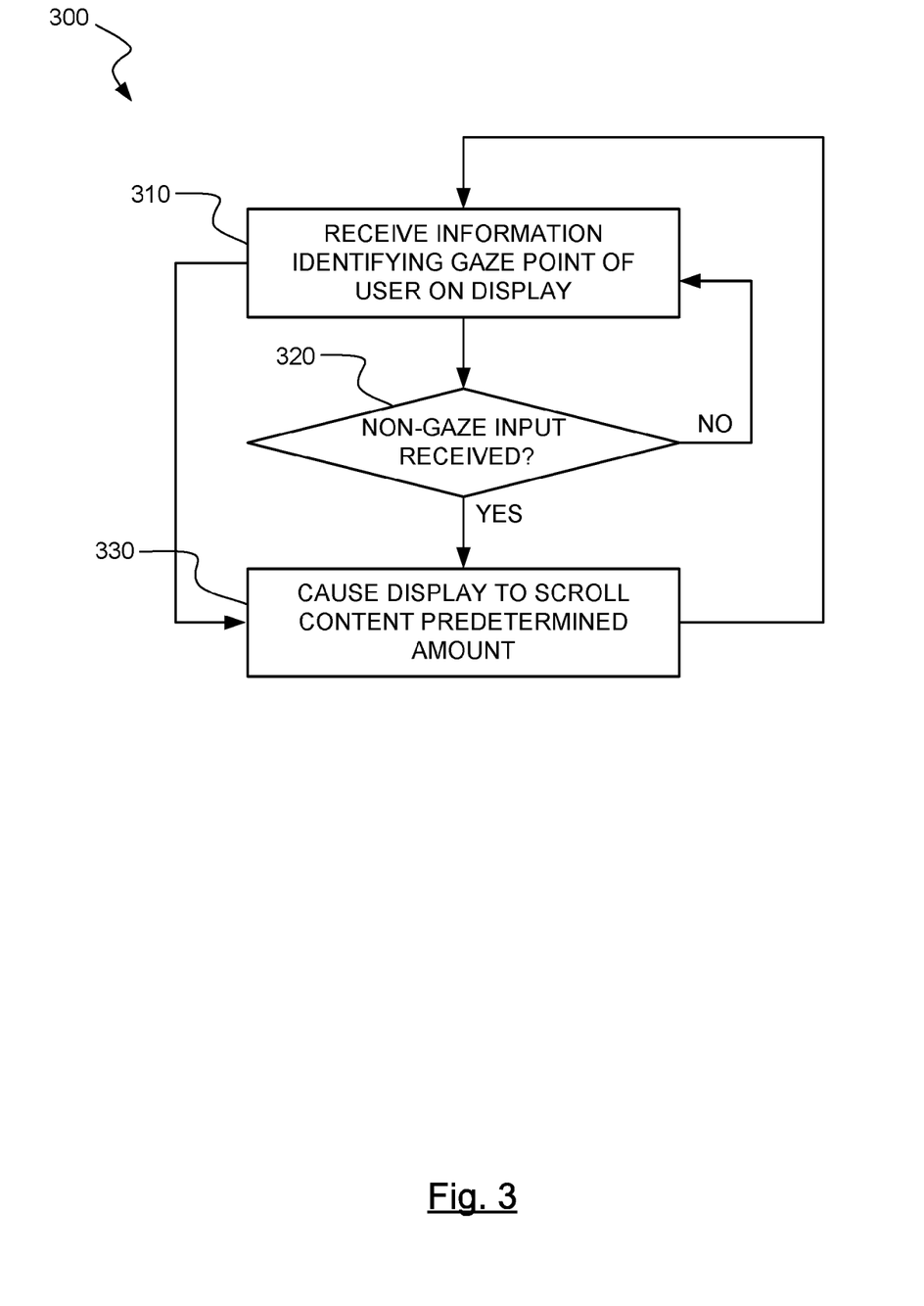
FIG. 3 is a block diagram of a method of an embodiment of the invention for causing a scroll on a display based on a gaze input.

FIG. 3 is a block diagram of a method 300 of an embodiment of the invention for causing a scroll on a display based on a gaze input. At block 310, information identifying a gaze point of a user on a display is received. At block 320, a non-gaze input is awaited. If such an input is not received, method 300 returns to block 310. However, if an input is received, then method 300 continues to block 330 and the display is scrolled a predetermined amount (usually in a direction opposite the side of the display/content in which the gaze point is located). In some embodiments, no non-gaze input may be required to cause a scroll (i.e., a scroll could occur merely by the gaze point being located at a particular portion of the display).

Figure 4:
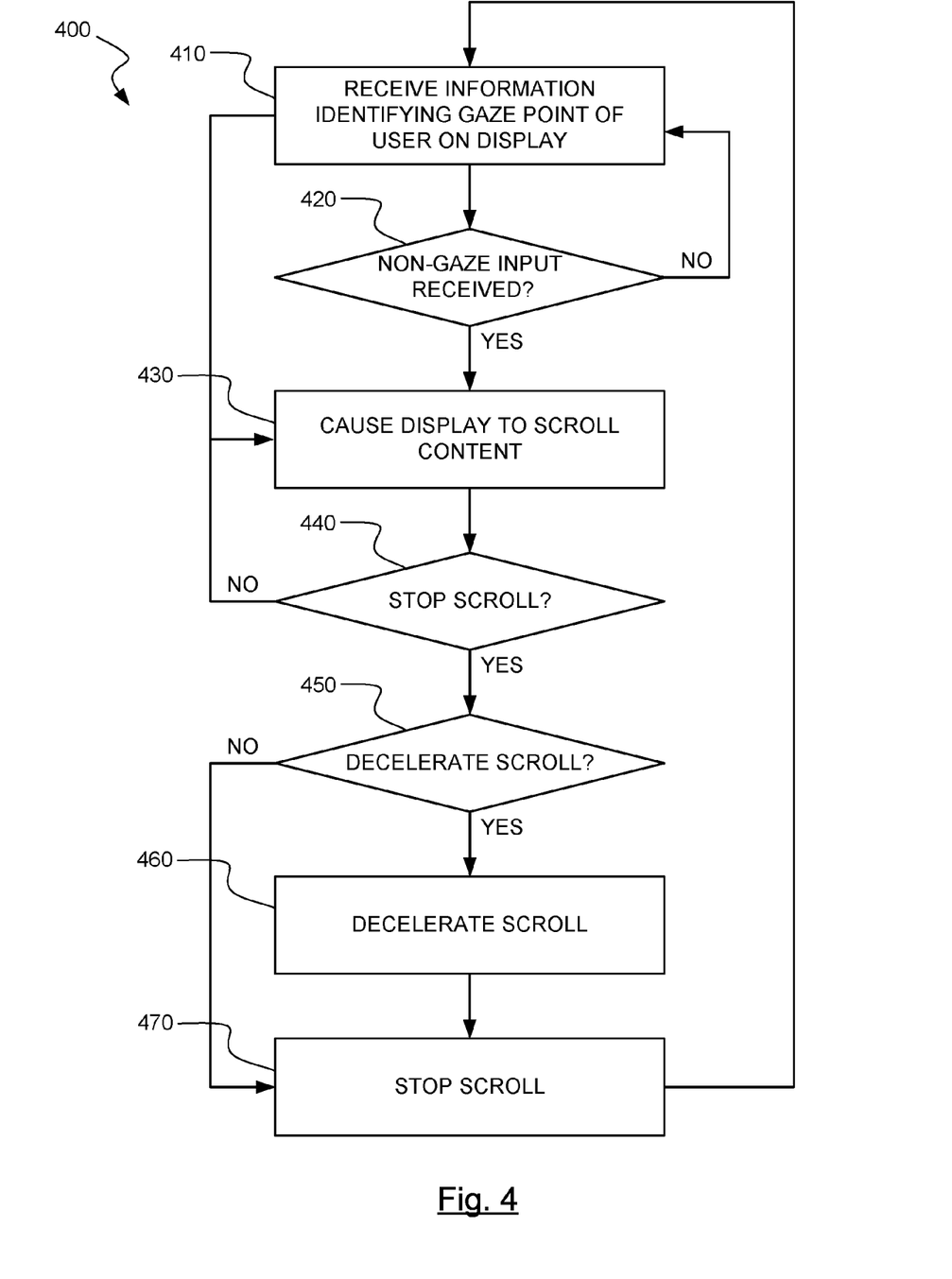
FIG. 4 is a block diagram of another method of an embodiment of the invention for causing a scroll on a display based on a gaze input.

FIG. 4 is a block diagram of another method 400 of an embodiment of the invention for causing a scroll on a display based on a gaze input. At block 410, information identifying a gaze point of a user on a display is received. At block 420, a non-gaze input is awaited. If such an input is not received, method 400 returns to block 410. However, if an input is received, then method 400 continues to block 430 and the display is scrolled (usually in a direction opposite the side of the display/content in which the gaze point is located). In some embodiments, no non-gaze input may be required to cause a scroll (i.e., a scroll could occur merely by the gaze point being located at a particular portion of the display). Then at block 440, method 400 determines whether to stop the scrolling. This may occur for a number of reasons discussed herein (e.g., the gaze input moves from an edge of the screen or some sub-portion thereof (i.e., a window of text, etc.); a non-gaze input is received; etc.). If the scrolling is to be stopped, at block 450 it is determined whether the scrolling should be decelerated prior to a complete stop. Whether the scrolling should be decelerated prior to stopping is dependent on the particular embodiment of the invention. If the scrolling is to be decelerated prior to stoppage, then at block 460, deceleration of the scrolling occurs. Deceleration may occur at a natural rate, or some rate which is dependent on a rate or vector of a gaze point change. At block 470, whether or not deceleration occurs, scrolling is stopped, and method 400 returns to block 410.

A seventh gaze provoked interaction includes scrolling a window or other area based on length or pressure of contact by a user upon a key, button, or touchpad. This interaction consists of the computer software refreshing a displayed window or other area to show previously non-shown information or text so as to appear that the window or other area is scrolling. The amount of non-shown information that is shown during the change in display depends on the length and/or pressure the user places on a key, button, or touchpad. For example, if a user maintains pressure on a key, button, or touchpad the computer software may continually refresh the display to show non-shown information so as to provide the effect of continuously scrolling information. The length of contact with the key, button or touchpad may be used to control the rate at which non-shown information is shown. If the key, button or touchpad is capable of measuring pressure (such as a pressure-sensitive touchpad) the amount of pressure may be used to control the rate at which non-shown information is shown. The direction upon which non-shown information is scrolled from may change dynamically based on the user's gaze point. For example, the non-shown information may appear from below the display if the user's gaze point is located towards the bottom of the display but then shift dynamically to displaying non-shown information from the right of the display if the user's gaze point moves to the right of the display. This is particularly useful when scrolling across a displayed map or the like.

Further, regarding gaze provoked interactions that perform scrolling functions, it may be possible to terminate any scrolling which occurs in multiple fashions. First, the scrolling may be terminated by a user pressing a key, button, touchpad, or the like. Secondly, the scrolling may be terminated by the computer software slowly decelerating the scrolling so as to provide a natural stop. This may be combined with a movement of the user's gaze to a predetermined area of the screen, or away from the area upon which the user had initially gazed to commence scrolling. Thirdly, decelerating the text may be combined with the pressing of a key, button, touchpad or the like, such that when a user desires to terminated scrolling, pressing the key, button, touchpad or the like will commence a natural deceleration of the scrolling.

An eighth gaze provoked interaction includes displaying new information on a display based upon a user's gaze location. In this interaction, when a user presses and maintains pressure on a key, button, or at least a portion of a touchpad, the computer software displays a summary/list of computer programs currently running on the computer. As a further example, this summary/list may be displayed when pressure is maintained on more than one key, button, and/or portion of a touchpad. This summary/list may be in the form of miniature versions of the computer programs, graphical summaries of the programs, and/or text based summaries of the programs. As a further improvement, only a subset of running computer programs may be displayed to the user, for example only those meeting a predetermined criteria such as only those with displayable GUI components, or those that have been accessed within a predetermined time period. While pressure is maintained on the key, button, or touchpad, the computer program indicates which summary a user is gazing at (this may be performed by highlighting the summary). Upon release of the key, button, or touchpad the computer software causes the computer program to be displayed whose summary was the last gazed at by the user (and potentially highlighted). Further, if pressure is maintained on more than one key, button, or portion of a touchpad to display a summary of running programs, releasing pressure on any key, button or portion of a touchpad may cause the computer program to be displayed.

Further, maintaining pressure on a key, button or portion of a touchpad whilst pressing at least once another key, button, or portion of a touchpad may cause a summary of computer programs to be displayed. A computer program may then be selected either by pressing the second key, button, portion of a touchpad, or by locating a gaze point over the desired summary and releasing the first key, button or portion of a touchpad.

In a further improvement of the eight gaze provoked interaction, the display of running programs may be instituted by a pinching gesture performed on a touch sensitive surface using two or more fingers, potentially five. Upon release of fingers from the touch sensitive surface or upon an opposing pinching gesture being performed on the touch sensitive surface, the highlighted (by gaze point) summary may be selected and thus displayed.

Figure 5:
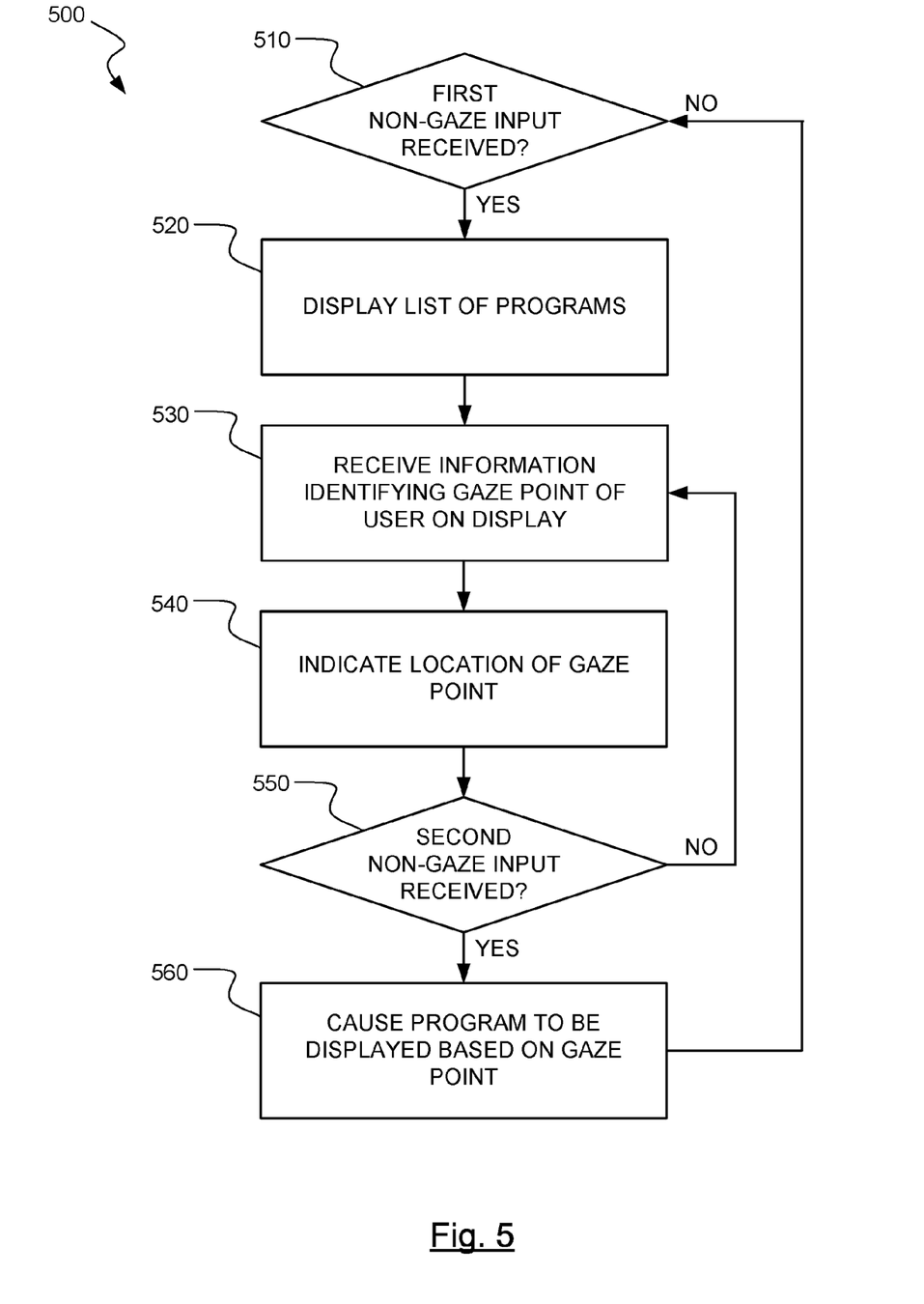
FIG. 5 is a block diagram of a method of an embodiment of the invention for selecting a program from a list of programs based on a gaze input.

FIG. 5 is a block diagram of a method 500 of an embodiment of the invention for selecting a program from a list of programs based on a gaze input. At block 510, a first non-gaze input is awaited. When such input is received, at block 520 a summary/list of programs is displayed. As discussed above, the list may be presented in various formats. At block 530, information identifying the gaze point of the user on the display may be received. At block 540, the location of the gaze point may be indicated to the user. This may occur via highlighting or other indication of a particular program in the summary/list which the user is gazing at. At block 550, a second non-gaze input is awaited. If no second non-gaze input is received, then method 500 returns to block 530. However, if a second non-gaze input is received, then at block 560 the program in the summary/list at which the user's gaze point was lying is displayed and/or activated.

A ninth gaze provoked interaction includes implementing either a scrolling or zooming gaze provoked interaction dependent on the location of a user's gaze. This interaction may include the computer software determining in which area on the display a user is gazing and determining which type of gaze provoked interaction to commence. For example, if a gaze point is determined to be at the center of an area such as a map, image, document, or the like, the computer software may determine that a zooming action is appropriate. However, if a gaze point is determined near the edge of an area such as a map, image, document, or the like, the computer software may determine that a scrolling or panning action is appropriate.

Additionally the speed of a performed action may be altered based upon the area on a display at which the user is gazing. For example, if a user gazes directly at the edge of a map, image, document, or the like, the computer software may direct that an interaction be performed quickly whereas if the user gazes more towards the middle of a map, image, document, or the like, the computer software may direct that an interaction be performed slightly slower. This is particularly advantageous when centering an item on the display.

Regarding the afore-mentioned gaze provoked interactions, where a gaze provoked interaction has been described with reference to the activation of a key, button, touchpad, or the like, it is understood that the described functionality may be achieved by combining activation of input methods. For example, regarding the third gaze provoked interaction, it is possible for the interaction to be performed by maintaining pressure on a first key, button, touchpad, or the like while pressing a second key, button, touchpad or the like. Further, it is possible that an interaction could be defined by maintaining pressure on a key, button, touchpad or the like and speaking a command. As a further example, an interaction could be activated by speaking a command on its own.

It is intended that any reference to a key, button, touchpad and the like also includes any form of non-gaze input that may be activated by a user. This includes screens that are capable of touch detection to receive an input. Further this may include other forms of input such as voice, gestures, brainwave detection, and the like.

It is intended that any reference to a computing system or the like include any device capable of executing instructions such that information is shown on a display. This includes computing devices such as mobile telephones, tablet computers, gaming devices, and the like.

The computing device(s) or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. In particular it is intended that the invention function with personal computers, laptops, tablet, mobile telephones, and wearable devices such as virtual reality, augmented reality, display, or helmet systems.

Figure 6:
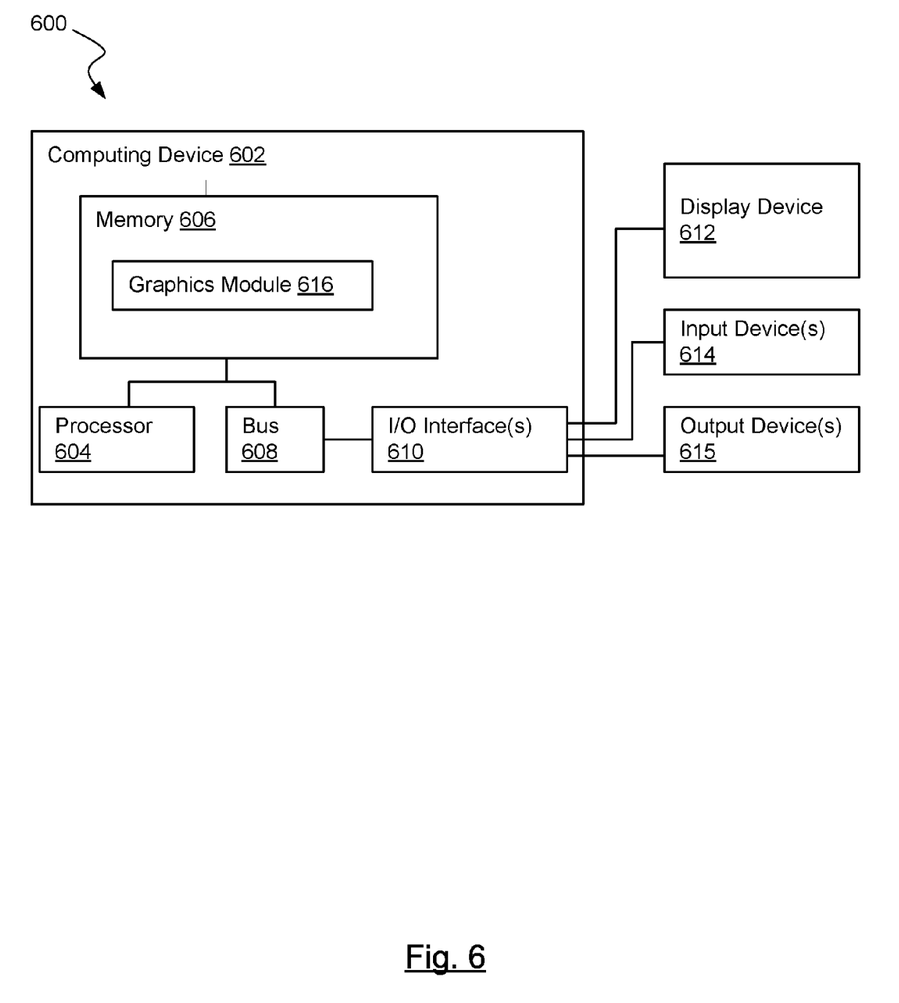
FIG. 6 is a block diagram of an exemplary system capable of being used in at least some portion of the apparatuses or systems of the present invention, or implementing at least some portion of the methods or procedures of the present invention.

By way of example and not limitation, FIG. 6 is a block diagram depicting an example computing device 602 for implementing certain embodiments. The computing device 602 can include a processor 604 that is communicatively coupled to a memory 606 and that executes computer-executable program instructions and/or accesses information stored in the memory 606. The processor 604 may comprise a microprocessor, an application-specific integrated circuit ("ASIC"), a state machine, or other processing device. The processor 604 can include any of a number of computer processing devices, including one. Such a processor can include or may be in communication with a computer-readable medium storing instructions that, when executed by the processor 604, cause the processor to perform the steps described herein.

The computing device 602 can also include a bus 608. The bus 608 can communicatively couple one or more components of the computing system 602. The computing device 602 can also include and/or be communicatively coupled to a number of external or internal devices, such as input or output devices. For example, the computing device 602 is shown with an input/output ("I/O") interface 610, a display device 612, input device(s) 614 and output device(s) 615.

Non-limiting examples of a display device 612 include a screen integrated with the computing device 602, a monitor external and coupled with the computing system, etc. Non-limiting examples of input devices 614 include gaze detection devices, touch screens, touch pads, external mouse devices, microphones and/or other devices mentioned herein, etc. A non-limiting example of an output device 615 is an audio speaker. In some embodiments, the display device 612, the input device(s) 614 and the output device(s) 615 can be separate devices. In other embodiments, the display device 612 and at least some of the input device(s) 614 can be integrated in the same device. For example, a display device 612 may be a screen and an input device 614 may be one or more components providing eye-tracking and/or touch-screen functions for the display device, such as emitters for emitting light and/or cameras for imaging a user's eye(s) and/or a touch area, etc. The screen, input device components and any output device components may be integrated within the same housing or in other integrated configurations.

The computing device 602 can modify, access, or otherwise use electronic content. The electronic content may be resident in any suitable non-transitory computer-readable medium and execute on any suitable processor. In one embodiment, the electronic content can reside in the memory 606 at the computing system 602. In another embodiment, the electronic content can be accessed by the computing system 602 from a remote content provider via a data network.

The memory 606 can include any suitable non-transitory computer-readable medium. A computer-readable medium may include, but is not limited to, electronic, optical, magnetic, or other storage device capable of providing a processor with computer-readable instructions or other program code. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

A graphics module 616 stored in the memory 606 can configure the processor 604 to prepare electronic content for rendering in a graphical interface and/or render the electronic content in the graphical interface. In some embodiments, the graphics module 616 can be a stand-alone application executed by the processor 604. In other embodiments, the graphics module 616 can be a software module included in or accessible by a separate application executed by the processor 604 that is configured to modify, access, or otherwise use the electronic content.

Figure 7:
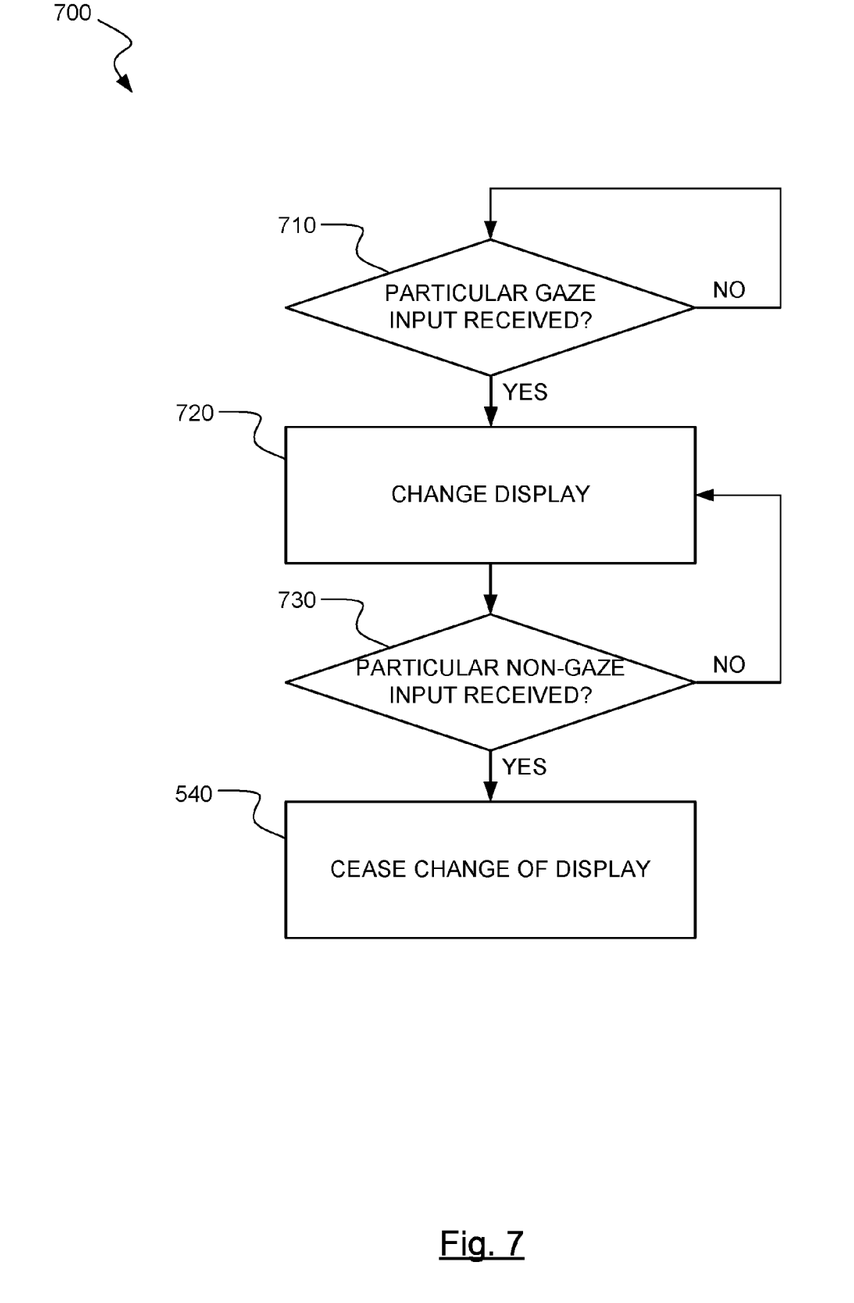
FIG. 7 is a block diagram of a method of an embodiment of the invention of changing a display based at least in part on a gaze point of a user on the display.

FIG. 7 is a block diagram of a method 700 of an embodiment of the invention of changing a display based at least in part on a gaze point of a user on the display. At block 710, if a particular gaze input received, for example a gaze input not proximate to the center of the display, then method 700 advances to block 720, and the display is changed based in least in part on the particular gaze input. For example, a perspective of virtual camera from which a display rendering is being produced is changed. In one example, if the user's gaze location is on the right side of the display, the display may pan right.

At block 730, in this embodiment a particular non-gaze input is awaited. Absent the non-gaze input being received, the display continues to change at block 720. However, if a particular non-gaze input is received, then at block 740 the change of the display ceases. For example, if panning of the display is occurring due to a gaze of the user being near an edge of the display, a keyboard input that is normally used to control panning may cause gaze-based panning to cease. While not shown, in some embodiments, if the particular gaze input ceases, then the change of the display may also cease. For example, if the user ceases gazing at an area proximate to an edge of the display and instead returns their gaze to an area proximate to the center of the display.

It should be understood that the various methods described herein for interacting with and controlling computer devices and computer programs may be implemented by way of computer-readable instructions or other program code, which may have various different and alternative functional arrangements, processing flows, method steps, etc. Any suitable programming, scripting, or other type of language or combinations of languages may be used to implement the teachings contained herein in software to be used in programming or configuring a computing device.

Unless specifically stated otherwise, it is appreciated that throughout this specification discussions utilizing terms such as "processing," "computing," "calculating," "determining," and "identifying" or the like refer to actions or processes of a computing device. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Numerous specific details are set forth herein to provide a thorough understanding of the subject matter of the various embodiments. However, those skilled in the art will understand that such subject matter may be practiced without some or all of these specific details. In other instances, methods, apparatuses, or systems that would be known by one of ordinary skill have not been described in detail so as not to obscure claimed subject matter.

While the present subject matter has been described in some detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention has now been described in detail for the purposes of clarity and understanding. However, it will be appreciated that certain changes and modifications may be practiced within the scope of the appended claims.

What is claimed is:

1. A method for changing a display based at least in part on a gaze point of a user on the display and a rotation of a head of the user, wherein the method comprises:
   receiving information identifying a location of the gaze point of the user on the display;
   receiving information identifying a degree of rotation of the head of the user, and
   based at least in part on the location of the gaze point, and the degree of rotation of the head of the user, causing a virtual camera perspective to change, thereby causing content on the display associated with the virtual camera to change, wherein causing the virtual camera perspective to change comprises changing a degree of rotation of the virtual camera, and the degree of rotation of the virtual camera is changed based at least in part on the location of the gaze point relative to a center of the display and an edge of the display.

2. The method for changing a display of claim 1, wherein causing the virtual camera perspective to change comprises:
   panning the virtual camera.

3. The method for changing a display of claim 1, wherein:
   when the location of the gaze point is at 50% of a distance between the center of the display and the edge of the display, the virtual camera will be rotated by five degrees.

4. The method for changing a display of claim 3, wherein:
   when the location of the gaze point is at the edge of the display, the virtual camera will be rotated by ten degrees.

5. The method for changing a display of claim 4, wherein:
   when the location of the gaze point is at the center of the display, the virtual camera will not be rotated.

6. The method for changing a display of claim 1, wherein:
   the degree of rotation of the virtual camera is further changed based at least in part on the degree of rotation of the head of the user.

7. The method for changing a display of claim 6, wherein:
   when the location of the gaze point of the user is at 50% of a distance between the center of the display and the edge of the display, the virtual camera will be rotated by five degrees plus 50% of the degree of rotation of the head of the user.

8. The method for changing a display of claim 6, wherein:
   when the location of the gaze point of the user is at 100% of a distance between the center of the display and the edge of the display, the virtual camera will be rotated by ten degrees plus 100% of the degree of rotation of the head of the user.

9. The method for changing a display of claim 1, wherein the method further comprises:
   ceasing change of the virtual camera perspective based at least in part on receipt of a non-gaze input.

10. The method for changing a display of claim 9, wherein:
    ceasing change of the virtual camera perspective comprises causing change of the virtual camera perspective to decelerate prior to stopping change of the virtual camera perspective.

11. A system for changing a display based at least in part on a gaze point of a user on the display and a rotation of a head of the user, wherein the system comprises:
    an eye tracking device for determining a location of the gaze point of the user on the display; and
    a processor for at least:
       receiving information identifying the location of the gaze point of the user on the display;
       receiving information identifying a degree of rotation of the head of the user; and
       based at least in part on the location of the gaze point, and the degree of rotation of the head of the user, causing a virtual camera perspective to change, thereby causing content on the display associated with the virtual camera to change, wherein causing the virtual camera perspective to change comprises changing a degree of rotation of the virtual camera, and the degree of rotation of the virtual camera is changed based at least in part on the location of the gaze point relative to a center of the display and an edge of the display.

12. The system for changing a display of claim 11, wherein:
the degree of rotation of the virtual camera is further changed based at least in part on the degree of rotation of the head of the user.

13. A non-transitory machine readable medium having instructions stored thereon for changing a display based at least in part on a gaze point of a user on the display and a rotation of a head of the user, the instructions executable by one or more processors to at least:
receive, from an eye tracking device, a location of the gaze point of the user on the display;
receive information identifying a degree of rotation of the head of the user; and
based at least in part on the location of the gaze point, and the degree of rotation of the head of the user, causing a virtual camera perspective to change, thereby causing content on the display associated with the virtual camera to change, wherein causing the virtual camera perspective to change comprises changing a degree of rotation of the virtual camera, and the degree of rotation of the virtual camera is changed based at least in part on the location of the gaze point relative to a center of the display and an edge of the display.

14. The non-transitory machine readable medium of claim 13, wherein:
the degree of rotation of the virtual camera is further changed based at least in part on the degree of rotation of the head of the user.

* * * * *